US010996945B1

(12) United States Patent
Allen

(10) Patent No.: US 10,996,945 B1
(45) Date of Patent: May 4, 2021

(54) SPLITTING PROGRAMS INTO DISTRIBUTED PARTS

(71) Applicant: Amazon Technologies, Inc., Reno, NV (US)

(72) Inventor: Nicholas Alexander Allen, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 156 days.

(21) Appl. No.: 14/489,266

(22) Filed: Sep. 17, 2014

(51) Int. Cl.
G06F 9/45 (2006.01)
G06F 8/72 (2018.01)
G06F 8/60 (2018.01)
G06F 8/30 (2018.01)

(52) U.S. Cl.
CPC .................. *G06F 8/72* (2013.01); *G06F 8/30* (2013.01); *G06F 8/60* (2013.01)

(58) Field of Classification Search
CPC ..... G06F 8/30; G06F 8/60; G06F 8/72; G06F 8/443; G06F 8/4452; G06F 8/451; G06F 8/452; G06F 8/456; G06F 9/5083; G06F 9/5088
USPC .................. 717/149, 151, 259–161; 718/105
See application file for complete search history.

(56) References Cited

U.S. PATENT DOCUMENTS

| 5,457,797 | A  | * | 10/1995 | Butterworth | .......... | G06F 9/5027 |
|           |    |   |         |             |            | 709/226     |
| 6,381,628 | B1 | * | 4/2002  | Hunt        | ..............  | G06F 9/465 |
|           |    |   |         |             |            | 709/201     |
| 6,470,085 | B1 | * | 10/2002 | Uranaka     | .................. | G06F 21/10 |
|           |    |   |         |             |            | 380/231     |
| 7,150,010 | B1 | * | 12/2006 | Ringseth    | .................. | G06F 8/315 |
|           |    |   |         |             |            | 717/140     |
| 8,584,099 | B1 | * | 11/2013 | Abi-Antoun  | ..............  | G06F 8/74   |
|           |    |   |         |             |            | 717/131     |
| 9,203,894 | B1 | * | 12/2015 | Ginzburg    | ................ | H04L 67/10  |
| 2002/0124240 | A1 | * | 9/2002 | Ruellan     | .................. | G06F 9/5066 |
|           |    |   |         |             |            | 717/140     |
| 2003/0002671 | A1 | * | 1/2003 | Inchalik    | ........... | G11B 20/00086 |
|           |    |   |         |             |            | 380/202     |

(Continued)

FOREIGN PATENT DOCUMENTS

EP 0746816 B1 * 10/2001 ........... G06F 9/5027

OTHER PUBLICATIONS

Kaszuba, "Call Graph", Wikipedia, Feb. 11, 2014, pp. 1.*

(Continued)

*Primary Examiner* — Jue Louie
(74) *Attorney, Agent, or Firm* — Davis Wright Tremaine LLP

(57) ABSTRACT

A computing resource service provider may provide computing resources for execution of a program on behalf of a customer. The program's resource requirements may grow over time and horizontal scaling of the programs execution may be a laborious task as the portion of the program's the in-memory state may not be replicated. The program may include a set of modules which may be split and distributed to one or more computer systems of the service provider for execution. A factoring plan may be used to determine a set of partitions, where each partitions contains a subset of the modules of the program. Performance data associated with the one or more computer systems executing the partitions may be used to determine the factoring plan.

20 Claims, 9 Drawing Sheets

(56) References Cited

U.S. PATENT DOCUMENTS

| | | | | |
|---|---|---|---|---|
| 2003/0140111 A1* | 7/2003 | Pace | G06F 8/60 | 709/214 |
| 2004/0064804 A1* | 4/2004 | Daniels | G06F 8/65 | 717/106 |
| 2004/0139342 A1* | 7/2004 | Aho | G06F 21/51 | 713/193 |
| 2004/0225952 A1* | 11/2004 | Brown | G06F 8/20 | 714/819 |
| 2005/0055322 A1* | 3/2005 | Masters | G06F 9/06 | |
| 2005/0216594 A1* | 9/2005 | O'Brien | G06F 9/546 | 709/227 |
| 2006/0230407 A1* | 10/2006 | Rosu | G06F 9/5088 | 718/105 |
| 2007/0047735 A1* | 3/2007 | Celli | G06F 21/125 | 380/30 |
| 2007/0094675 A1* | 4/2007 | Ryan | G06F 9/548 | 719/330 |
| 2007/0204266 A1* | 8/2007 | Beaty | G06F 9/45558 | 718/1 |
| 2008/0196025 A1* | 8/2008 | Meijer | G06F 8/45 | 717/177 |
| 2009/0222504 A1* | 9/2009 | Vandanapu | G06F 8/61 | 709/201 |
| 2010/0318999 A1* | 12/2010 | Zhao | G06F 9/5044 | 718/104 |
| 2011/0202928 A1* | 8/2011 | Nakano | G06F 9/5011 | 718/104 |
| 2011/0231469 A1* | 9/2011 | Wolman | G06F 9/5094 | 709/201 |
| 2011/0320520 A1* | 12/2011 | Jain | G06F 9/5072 | 709/203 |
| 2013/0262923 A1* | 10/2013 | Benson | G06F 8/60 | 714/15 |
| 2013/0304788 A1* | 11/2013 | DeLuca | G06F 8/61 | 709/201 |
| 2014/0068560 A1* | 3/2014 | Eksten | G06F 9/5066 | 717/120 |
| 2014/0108438 A1* | 4/2014 | Duffy | G06F 16/288 | 707/756 |
| 2014/0215035 A1* | 7/2014 | Anderson | G06F 9/5088 | 709/223 |
| 2015/0379076 A1* | 12/2015 | Grosse | G06F 17/30463 | 707/718 |

OTHER PUBLICATIONS

IAR, "Examining the Call Graph", IAR Systems, 2014, pp. 1.*

Zdancewic et al. "Secure Program Partitioning", 2002, ACM Transactions on Computer Systems (TOCS), pp. 283-328.*

Chong et al. "Building Secure Web Applications with Automatic Partitioning", 2009, Communications of the ACM, vol. 52, No. 2, pp. 79-87.*

Smit et al. "Partitioning Applications for Hybrid and Federated Clouds", 2012, Proceedings of the 2012 Conference of the Center for Advanced Studies on Collaborative Research, pp. 27-41.*

Jul et al. "Fine-Grained Mobility in the Emerald System" 1988, ACM Transactions on Computer Systems, vol. 6, No. 1.*

Black et al. "The Development of the Emerald Programming Language", 2007, Proceedings of the third ACM SIGPLAN conference on History of programming languages.*

Cuervo et al. "MAUI: Making Smartphones Last Longer with Code Offload", 2010, Mobisys'10.*

Chun et al. "CloneCloud: Elastic Execution between Mobile Device and Cloud", 2011, EuroSys'11.*

Andrew Birrell "Secure Communication Using Remote Procedure Calls", 1985, ACM Transactions on Computer Systems, vol. 3, No. 1.*

Jonathan Katz "Public-Key Cryptography", 2010, Handbook of Information and Community Security, Springer, pp. 21-34.*

* cited by examiner

SPLITTING PROGRAMS INTO DISTRIBUTED PARTS

BACKGROUND

The use of network computing and storage has proliferated in recent years. The resources for network computing and storage are often provided by computing resource providers who leverage large-scale networks of computers, servers and storage drives to enable clients, including content providers, online merchants and the like, to host and execute a variety of applications and web services. Content providers, online merchants and developers, who traditionally used on-site servers and storage equipment to host their websites and store and stream content to their users, often forego on-site hosting and storage and turn to using the resources of the computing resource providers. The usage of network computing allows content providers and online merchants, among others, to efficiently and adaptively satisfy their computing needs, whereby the computing and storage resources used by the content providers and online merchants are added or removed from a large pool provided by a computing resource provider as needed and depending on their needs.

In addition, content providers, online merchants and developers may use the network computing resources and storage to execute a variety of different application. These application may have resource requirements that can be unpredictable and grow over time to exceed the capacity of a single computer system or network computing resource. The computing resources available to the application may be increased by horizontally scaling the application. Common techniques for horizontally scaling a particular application may include replicating the particular application across multiple servers or computing resources. For applications that include in-memory state, horizontal scaling may be a laborious task as the portion of the application using the in-memory state cannot be replicated.

BRIEF DESCRIPTION OF THE DRAWINGS

Various embodiments in accordance with the present disclosure will be described with reference to the drawings, in which.

DETAILED DESCRIPTION

Figure 1:
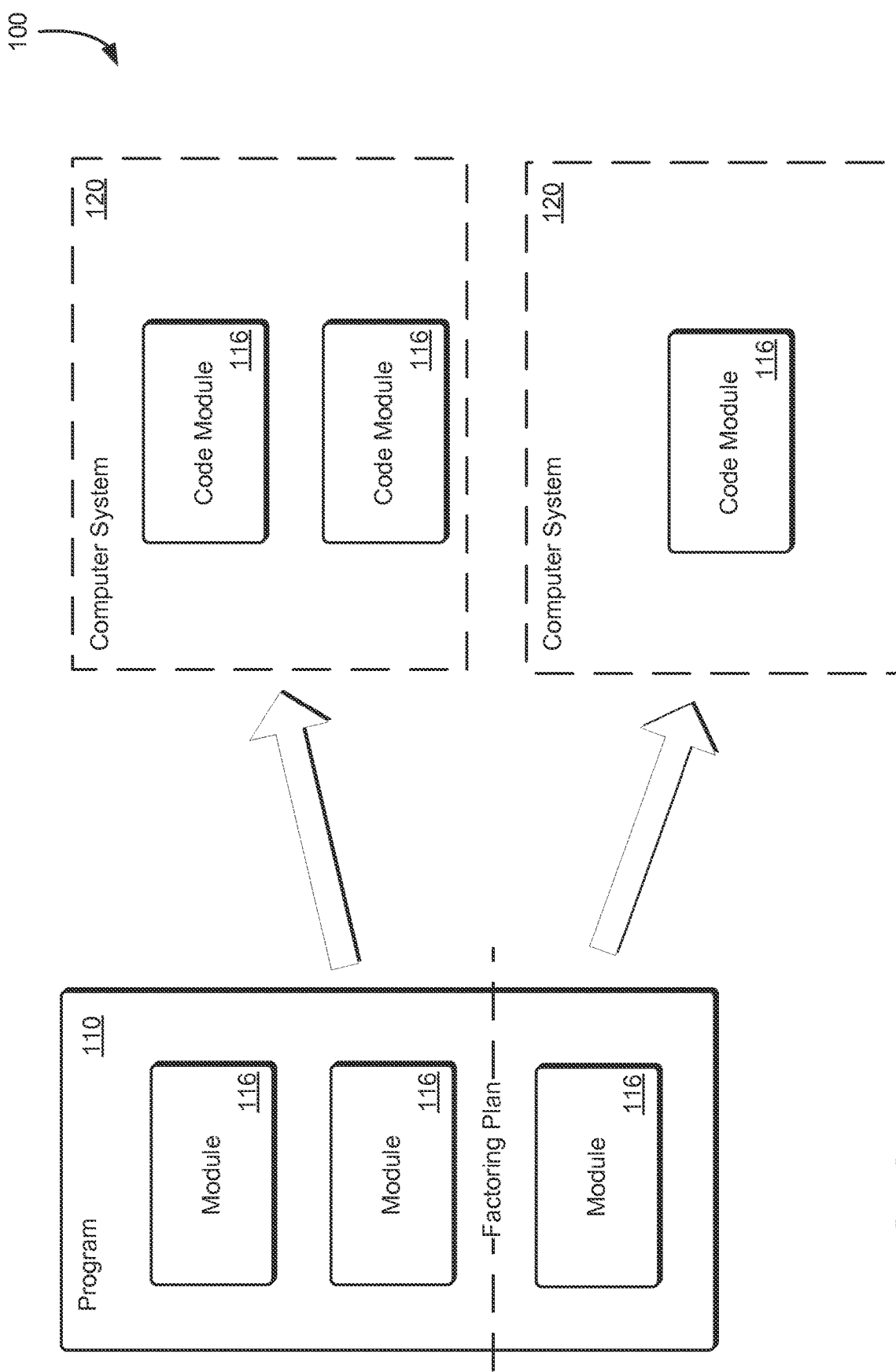
FIG. 1 illustrate an example of an environment in which a program may be partitioned and relocated in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to improvements in scaling an application to allow the application access to a greater amount of computing resources then what may available to the application executing on a single instance of a computer system or computing resource. Portions of the application may be carved off and relocated to allow the non-replicable portion of the application to grow. The relocation process may involve numerous tradeoffs and considerable developer and operational time may be required each time the application is refactored into a new configuration where portions of the application are carved off and relocated. The application may be executed using network computing resources of a computing resource service provider. The application may include a variety of difference applications and may be executed by a customer of the computing resource service provider. The customer may be an entity or organization such as a content provider, online merchant, or developer. Customers may execute the application using network computing resources of the service provider and may scale the application in order to increase an amount of computing resource accessible to the application. Customers may scale the application vertically by increasing the amount of computing resources available to a single instance of the application. Additionally, customers may scale the application horizontally my increasing the number of instances of the application.

In some embodiments, the application has several attributes that make scaling the application difficult. For example, the application may have state information contained in the memory of the application that is to be processed by various portions of the application making the sharing of the state information difficult between instances of the application. Additionally, these attributes of the application may create issues when scaling the application. For example, if the new configuration frees up too few computing resources for the application, the time and computing resources are wasted and the process must be repeated again in the near future in order to allocate additional computing resources to the application. In another example, if the new configuration divides the application into too many pieces, application performance may be unnecessarily impacted. A method for automating the process of carving off and relocating portions of the application in response to application resource requirements is described herein. As a result of automating the process, the process may be run repeatedly as application resource requirements grow or shrink in order to determine an optimal factoring of application and portions thereof.

In some embodiments, the process includes receiving an application (also referred to as a program) including an annotated set of modules. The modules may be functions or other components of the program configured to execute one or more operations of the program. The annotations of the set of modules may indicate the location cross-module function calls or other attributes of the program that may cause inefficiency during splitting and distribution of the program. The modules may be split (partitioned) into partitions according to a factoring plan, where each partition is executed by a computer system and performs the operations of the portion of the program contained in the modules included in the particular partition. Furthermore, performance information may be obtained from the computer system containing an instance of one or more modules of the program. The factoring plan may be generated based on the performance information obtained from the computer system.

The factoring plan may indicate to a deployment packager which of the modules to split into a plurality of module sets each to be executed by a particular partition. A module rewriter may then insert instructions into at least a portion of the modules, the instructions operable to establish at least one encrypted communications channel to enable modules of different partitions to exchange data. The deployment packager may then construct, based on the factoring plan, a plurality of deployment bundles, each deployment bundle including at least one module set and including encryption keys operable to send and receive messages over at least one encrypted communications channel associated with the at least one module set. The deployment bundles may then be transmitted to a targeted sets of computer systems configured to execute the partition. The process may improve resource utilization of computing resources of a computing resource service provider as well as increase the amount of computing resources available to an application.

FIG. 1 illustrates an environment 100 in which a program 110 may be split in to a plurality of partitions [120] to enable the program 110 to access additional computing resources in accordance with at least one embodiment. The program 110 may be the source code of an application. The program may be complied or otherwise converted in to an executable formation, such as a binary file, that, when executed by one or more processors of a computer system, causes the computer system to execute the application. For example, the program 110 when executed may cause the computer system to process data to produce an output. In another example, the program may cause the computer system to generate a simulation of one or more events. Furthermore, the program 110 may consist of one or more different modules 116, where the modules include programmatic code that when executed by one or more processors of a computer perform various operations of the program 110. The modules 116 may be functions of the program, one or more lines of source code of the program 110, a logical collection of operations of the program 110, or other identifiable portion of the program 110 such as a program module. Furthermore, each module 116 may cause different functionality when executed by the computer system. For example, a first module of the program may be configured to obtain program data and calculate a value based at least in part on the obtained data and a second module of the program may be configured provide a graphical representation of the calculated value. In some embodiments, the program include annotations associated with one or more modules 116 of the program described in greater detail below in connection with FIG. 2.

In some embodiments, a factoring plan may be generated, the factoring plan may indicate one or more partitions 120 of the program 110. The factoring plan may be generated by a performance analyzer based at least in part on the performance of the program 110 and/or partitions of the program 120 when executed by a computer system 120. The performance analyzer and generation of the factoring plan are described in greater detail below in connection with FIG. 4. As illustrated in FIG. 1, the factoring plan may indicate one or more modules of the program 110 to include in a particular partition. For example, a particular program may include 3 modules 116, module 1, module 2, and module 3. The factoring plan may indicate that module 1 and module 3 are to be included in one partition and module 2 is to be included in another partition each partition to be executed by a different computer system 120.

The partitions may be executed by a computer system 120 or virtual computer system and as a result of execution of the partitions an output may be generated. The program 110 or partitions of the program may access one or more data objects and generate one or more data objects. The data object may be stored in memory of the computer system 120 or virtual computer system executing the partition. Similarly, the computer system 120 enables the partitions access to one or more data objects and the ability to generate one or more data objects of the program 110. However different partitions may require access to the same in-memory state (e.g., two or more modules may perform operations on the same data object or set of data objects). As described in greater detail below, various different techniques may be used to enable one or more partitions to access shared in-memory state information. For example, a particular area of the data for the program 110 may be designated as a shared memory area for two or more partitions accessing the same in-memory state information.

Figure 2:
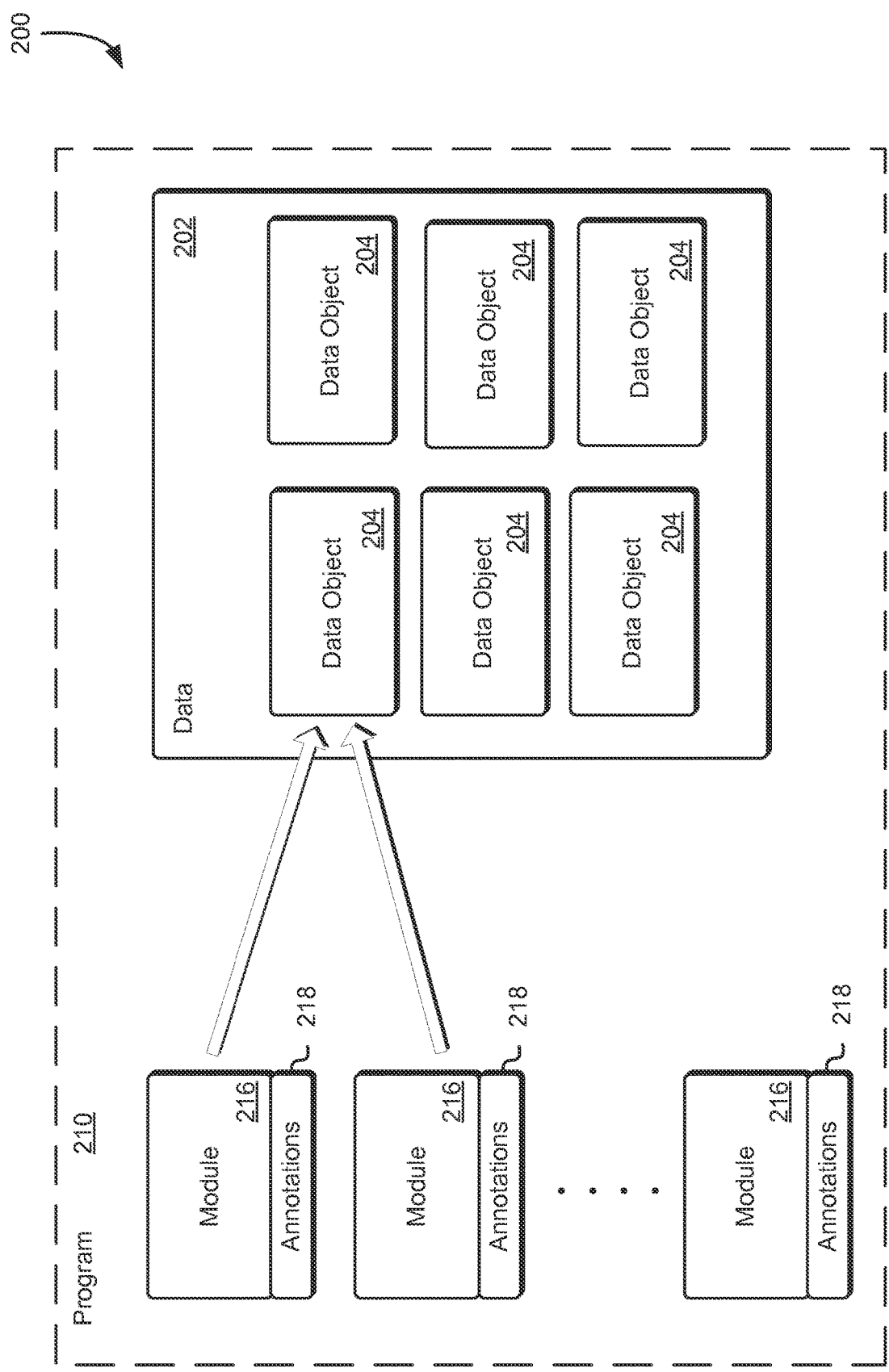
FIG. 2 illustrate an example of an environment in which a partitioned program may access data associated with the program in accordance with at least one embodiment.

FIG. 2 illustrates an environment 200 in which two or more modules 216 of a program 210 may share state information in accordance with at least one embodiment. The program 210 may be any software application, executable code, or source code as described above. Furthermore, the program 210 may have data 202 associated with the program 210. The data 202 may be any data useable by the program 210 as an input for determining an output. For example, the data 202 may include one or more logs, computer system metrics, simulation data, user data, customer data, or utilization data. Furthermore, the data 202 may include a plurality of data objects 204. The data objects 204 may be elements of the data 202, memory areas of the data 204, or any other portion of the data 202 that is identifiable from at least one other portion of the data 202. For example, the data objects 204 may include one or more rows of a log, metrics from a particular computer system, an output determined by a module 216 of the program 210, or an output from another application.

As illustrated by FIG. 2, in some embodiments, two or more modules 216 of the program 210 may access and/or perform operations on the same set of data objects 204. Furthermore, the program 210 may include a set of annotations 218 indicating modules 216 that may access and/or perform operations on the same set of data objects 204. The annotations may be included in the programmatic source code of the program 210 or may be included in a separate file or other object. For example, a developer may include annotations 218 in the source code during development of the program 210. In another example, a developer may create the program 210 and may generate the annotations 218 at a later date in order to enable a computing resource service provider to execute the program on behalf of the developer using techniques described herein. In various embodiments, the annotations 218 for the program 210 may be generated without developer or other user interactions. The computing resource service provider or application thereof may analyze the programmatic source code of the program 210 and may determine the modules 216 that share in-memory state. The annotations 281 may be generated based at least in part on the determination and may indicate modules 216 that share at least some in-memory state information.

The annotations 218 may include a variety of different information, including as described above, modules 216 of the program 210 that share at least some in-memory state information. Additionally, the annotations 218 may indicate potential split-points that are suitable for generating partitions. The annotations 218 may also indicate potential split-points that may cause a degradation in application performance or modules that share in-memory state information and therefore would require additional cross-module functions calls in order to maintain proper operations of the program 210. For example, using the annotations 218, a developer may indicate modules 218 that do not share in-memory state and modules 218 that share at least some in-memory state. As described in greater detail below, the computing resource service provider or component thereof, such as the performance analyzer, may determine, based at least in part on the annotations, a factoring plan configured to enable the program 210 to be split into one or more partitions where the modules 216 of the program 210 are contained in at least one partition of the program 210.

Figure 3:
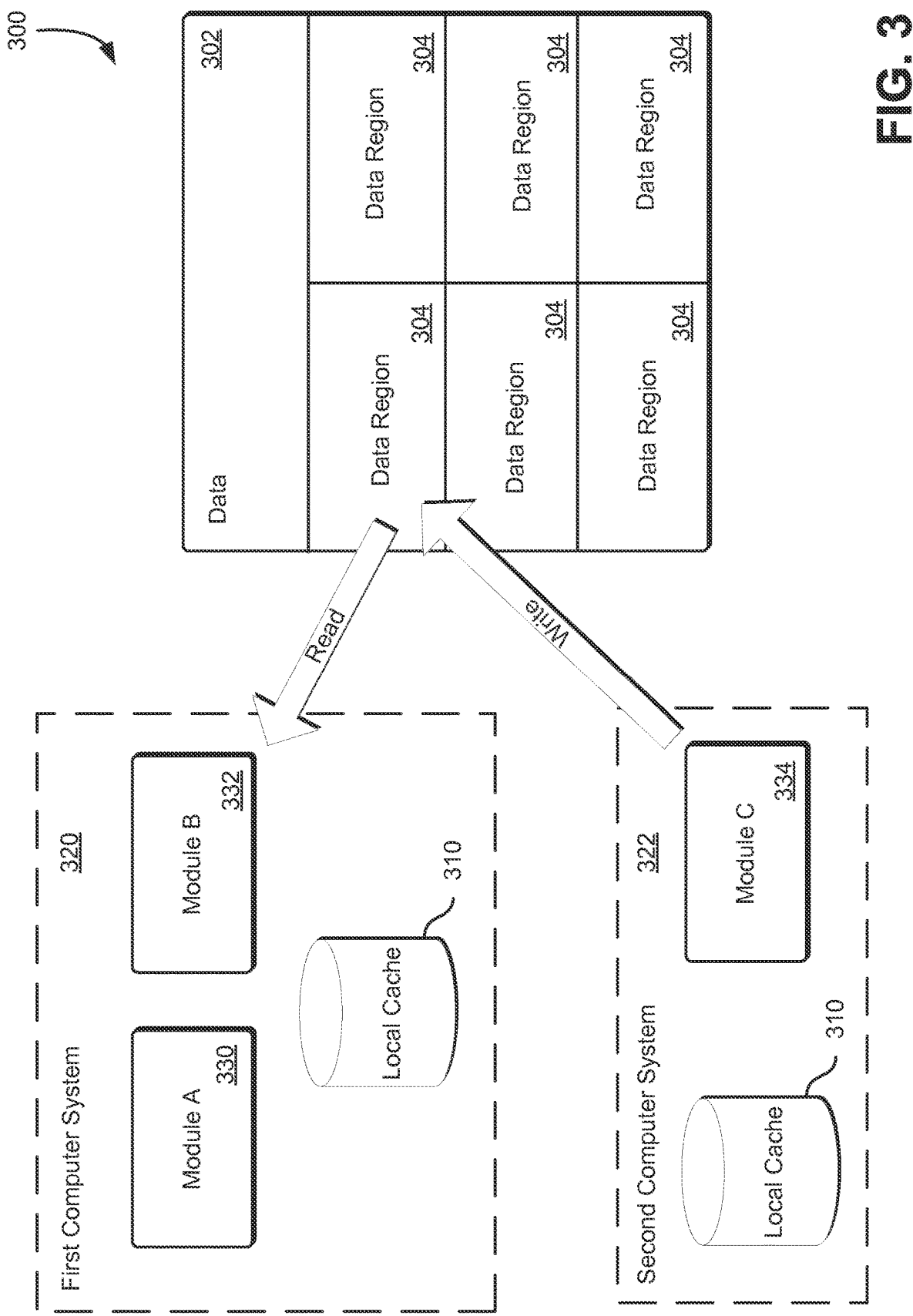
FIG. 3 illustrate an example of an environment in which a partitioned program may access data associated with the program in accordance with at least one embodiment.

FIG. 3 illustrates an environment 300 in which two or more modules included in two or more different partitions of a program may share state information in accordance with at least one embodiment. The partitions may be executed by a computer system based at least in part on a factoring plan and may include one or more modules of a program. As illustrated in FIG. 3, a first computer system 320 may include module A 330 and module B 332 according to a first partition and a second computer system 322 may include module C 334 according to a second partition. The first and second partition may be indicated in a factoring plan of the program. Furthermore, each partition may include a local cache 310 provided by the computer system which may include data 302 of the program required for an operation of the module. For example, module C 334 may require a particular data object as described above. The second computer system 322 may obtain that data object and load the data object into the local cache 310 such that the data object is accessible to module C 334. Module C 334 may then perform various operations on the data object and may write data objects to data 302 of the program.

As illustrated in FIG. 3, the data 302 may be subdivided or otherwise broken up into one or more data regions 304. The data regions 304 may enable two or more modules to share state information and other data during execution of the program by two or more partitions on different computer systems. For example, a particular data region 304 may be designated as a shared data region between two or more partitions. For example, data region 304 may be a shared data region between the first partition and the second partition. Various cache coherency protocol or mechanisms may be used to coordinate in-memory state information between the various modules of the program executed by different partitions. For example, the first write to local cache 310 by module C 334 may perform a write through to data region 304, which implicitly invalidates other local caches 310. After which, module C 334 may write to local cache 310 without writing to shared data region 304 of data 302. Module C 334 may then write the local cache 310 to data region 304 and indicate that the content of the data region is unchanged enabling that state information contained in data region 304 to be shared. For example, module B 332 may now access data regions 304 and obtain state information modified by module C 334. The various cache coherency protocols or mechanisms may include, for example, MSI, MESI, MOSI, MOESI, MERSI, MESIF, write-once, and Synapse, Berkeley, Firefly and Dragon protocol.

Figure 4:
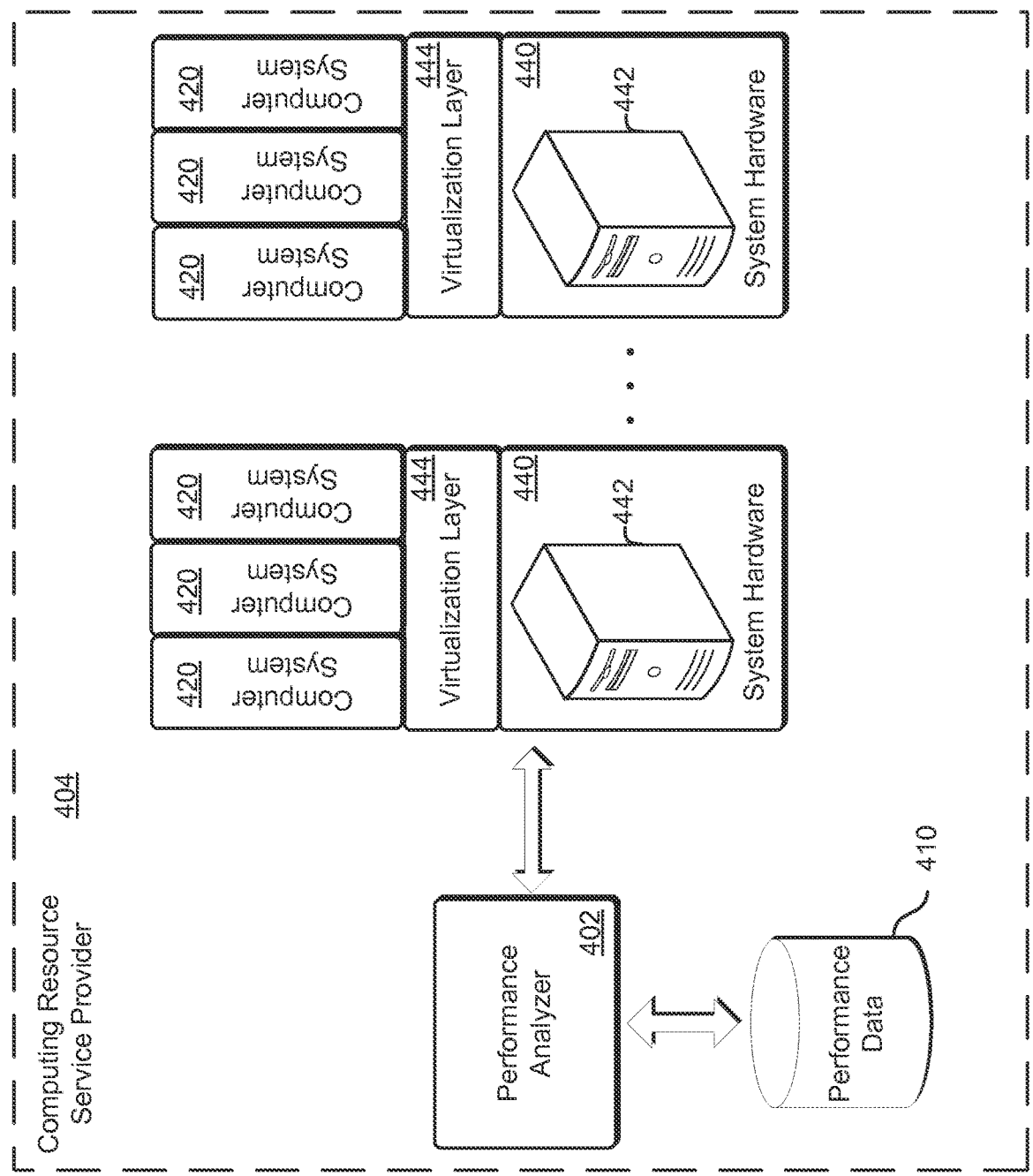
FIG. 4 illustrate an example of an environment in which performance data associated with a partitioned program may be obtained in accordance with at least one embodiment.

FIG. 4 illustrates an environment 400 in which a performance analyzer 402 may collect information corresponding to one or more computer systems 420 of a program in accordance with at least one embodiment. The performance analyzer 402 may comprise one or more components which may collectively be configured to enable the computing resource service provider 404 to determine an optimal factoring plan for a particular program based at least in part on the performance of various computer systems when executing modules of the particular program. For example, the performance analyzer may be a virtual computer systems supported by computing resources of the computing resource service provider 404. The information collected by the performance analyzer 402 may be used to determine one or more factoring plans for a set of modules of a program as describe above. Furthermore, a set of annotations associated with the set of modules of the program may be used in connection with the collected information to determine one or more factoring plans. A virtual computer system service, which may be system hardware 440, is used by a computing resource service provider 404 to provide computational and other resources for the computer systems 420 of a program. The computer systems 420 and partitions executed by the computer systems 420 may be determined by a factoring plan and provided to the virtual computer system service by a deployment packager described in greater detail below.

The system hardware 440 may include physical hosts 442. The physical hosts 442 may be any device or equipment configured to execute instructions for performing data computation, manipulation or storage tasks, such as a computer or a server. A physical host 442 may be equipped with any needed processing capability including one or more processors, such as a central processing unit (CPU), a graphics processing unit (GPU) or a digital signal processor (DSP), memory, including static and dynamic memory, buses and input and output ports that are compliant with any handshaking, communications or data transfer protocol. The system hardware 440 may also include storage devices, such as storage disks and tapes, networking equipment and the like.

A virtualization layer 444 executing on the physical host 442 enables the system hardware 440 to be used to provide computational resources upon which the one or more computer systems 420 of the program may operate. For example, the virtualization layer 444 may enable a particular computer systems 420 to access system hardware 440 on the physical host 442 through virtual device drivers on the virtual machine 420. Furthermore, physical host 442 may host multiple computer systems 420 of the same or different types on the same system hardware 440. The computer systems 420 may be any device, software or firmware used for providing a computing platform for one or more modules of a program as described above. For example, the computer systems 420 may be a virtual computer system executing an operating system and a set of modules of the program as indicated by a factoring plan. The operating system or other software of the virtual computer system may be responsible for causing execution of the set of modules of the program. Furthermore, the computer systems 420 may be generated and/or instantiate as a result of the deployment packager executing a particular factoring plan.

In addition, the virtualization layer 444 may include an agent or other application (not shown in FIG. 4 for simplicity) configured to provide the performance analyzer 402 with information corresponding to the computer systems 420. In some embodiments, the agent or other application is executed by the computer systems 420. Returning to the example above, the operating system of the virtual computer system may include an agent configured to communicate performance information of the computer system 420 to the performance analyzer 402. The performance information of the computer system 420 may be used to determine the utilization metric for the modules included in the partition executed by the computer system 420. The utilization metric may be a measure of the amount of computing resources utilized by the computer systems 420 in performing various operations during executing of the partitions. The performance information provided to the performance analyzer 402 may include resource utilization of the computer systems 420, resource utilization of the physical hosts 442 and the system hardware 440, resource utilization of various modules of the computer systems 420, number and/or frequency of cross-module calls performed by the computer systems 420, the amount of data serialized by the computer systems during the cross-module function calls, the duration of the cross-module function calls, or any other information suitable in determine the performance of a particular factoring plan.

The virtual computing platform may include various virtual computer components, such as one or more virtual CPUs, virtual memory and the like. The computer systems 420 may be provided to a customer of the computing resource service provider 404 as a result of the customer requesting splitting and distributing the customer's program. Further, the computing resource service provider 404 may use one or more of its own virtual machines 420 for executing its applications, such as the performance analyzer 402 service described above. Additionally, as illustrated in FIG. 4, the computing resource service provider 404 or component thereof, such as the performance analyzer 402, may cause performance information obtained from the computer systems 420 to be store as performance data 410. The performance data 410 may be stored in a storage device as described above.

In various embodiments, the performance analyzer 402 may store performance data corresponding to various factoring plans. For example, the computing resource service provider may be configured to test various factoring plans to determine an optimal factoring plan for a particular application. As a result, the performance analyzer 402 may store performance information for each factoring plan under test as performance data 410. Furthermore, the performance 410 may be used to determine one or more split-points for a particular factoring plan. For example, the performance data 410 may indicate that a particular partition used 80 percent of the resources of a particular computer system 420. Furthermore, the performance data 410 may also indicate that the particular computer system 420 executed two modules of the program. The performance analyzer 402 may then estimate the resource utilization of the two modules at 40 percent based at least in part on the performance data 410.

In various embodiments, a default factoring plan is be implemented by computing resource service provider in order to obtain performance data 410 suitable in determining one or more factoring plans. In yet other embodiments, the annotations described above may include an initial factoring plan enabling the performance analyzer to collected performance data 410 of one or more computer systems 420 in order to determine additional factoring plans. The performance analyzer 402 may use the performance data 410 and/or annotations as inputs to one or more functions configured to output the set of factoring plans. For example, the performance data 410 may indicate an amount of resource utilization for each module, the performance analyzer 402 may use the indicated amount of resource utilization to determine a set of modules to include in a particular partition. Specifically, if the performance data 410 indicates two modules have a resource utilization rate of 0.5 the performance analyzer 402 may combine the two modules into a single partition.

Furthermore, a penalty function may be used in conjunction with the function described above for determining the set of factoring plans. The penalty function may establish a penalty associated with violating one or more constraints within a system and, in some embodiments, may have its importance (or weighting) adjusted as the program optimization proceeds. A penalty function may be based on performance of the computer systems executing the partitions and the amount of resources available to the computing resource service provider. For example, the penalty function may be configured such that the performance analyzer 402 is prevented from placing modules of the program on a particular partition such that the resource utilization of the modules is above the maximum about of resources available to the computer system 420 executing the partition. Specifically, if the resource utilization of three modules is 0.4 the penalty function may prevent the performance analyzer 402 from placing all three modules on to a single portion.

The performance analyzer 402 may periodically or aperiodically determine a new set of factoring plans and/or select a new factoring plan for implementation by the computing resource service provider 404. For example, the performance analyzer 402 may be configured select a new factoring plan based at least in part on increased resource requirements of the program. In another example, the performance analyzer mat select a new factoring plan as in iterative process in order to collect performance data 410 and determine an optimal factoring plan. A weighted function may be used to select a particular factoring plan. The weighted function may establish a bias or skew a function towards a particular element over another particular element of the function. The weighted values may be adjusted based at least in part on the performance of factoring plans selected using the particular weighted values.

Figure 5:
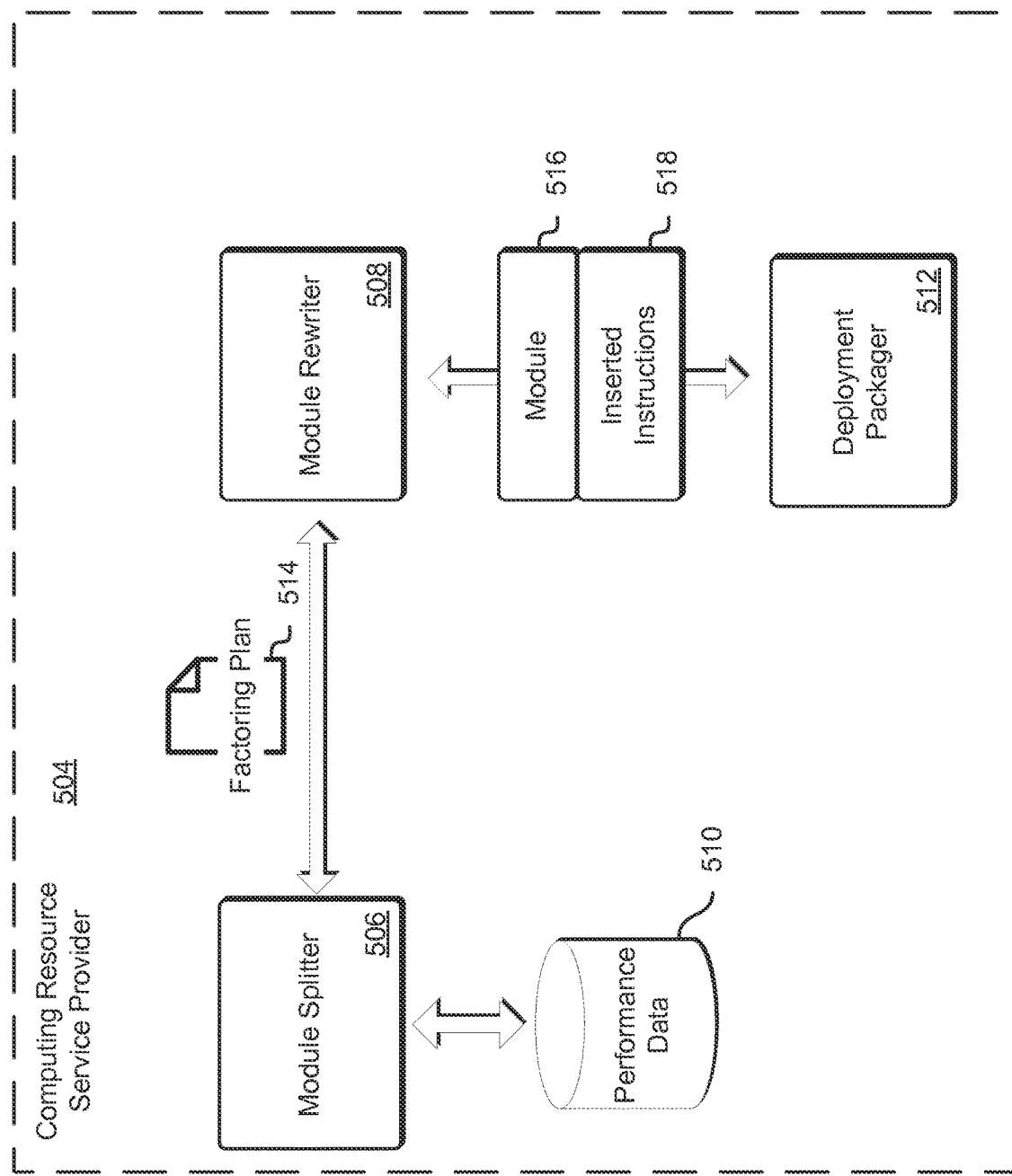
FIG. 5 illustrate an example of an environment in which a factoring plan may be used to generate a deployment bundle for a program in accordance with at least one embodiment.

FIG. 5 illustrates an environment 500 in which a computing resource service provider 504 may split a program in to modules which may be distributed to various partitions in order to execute the program. As described above, a performance analyzer may determine to split a program in to various parts for execution by one or more partitions according to a factoring plan 514. The factoring plan may indicate particular modules to include a particular partitions as well as the modules that require a cross-module communication channel to be inserted by a module rewriter 508. For example, the factoring plan may indicated that modules A, B, and C will be placed in a first partitions and modules D and E will be place in a second partitions. Furthermore, the factoring plan 514 may also indicate that modules B and D require a cross-module communications channel. The factoring plan 514 may be a file, record in a database, or other object containing information capable of indicating cross-module function calls and which partitions contain which modules.

Once the computing resource service providers 504 has determined to generate a new deployment package, the module 506 splitter may obtain the factoring plan from the performance data or, in some embodiments, directly from the performance analyzer. The module splitter 506 may be a computer system, as described above, configured to separate modules of the program. For example, a program may include a variety of module included in the source code of the program, the module splitter 506 may collect the source code corresponding to each module of the program. The module splitter 506 may then provide the modules and the factoring plan 514 the module rewriter 508. The module rewriter 508 may be a computer system, as described above, configured to insert additional instructions into the modules obtained from the module splitter 506 in order to enable cross-module communications. The inserted instructions 518 may, when executed by one or more processors of a computer system, cause the computer system to establish an encrypted communications channel associated with another module. The encrypted communications channel may be established using cryptographic material. Cryptographic material may include a set of cryptographic keys and/or information from which a set of cryptographic keys can be derived by inputting the information into a cryptographic function. In some embodiments, the module rewriter 508 modifies the binary executable instructions of the module 516 in order to enable cross-module communication.

The module 516 and the inserted instructions 518 may be provided to the deployment packager 512. The deployment packager 512 may be a computer system, as described above, configured to generate a deployment bundle which may be used to instantiate one or more portions of the program for execution as described below. The deployment packager 512 may obtain the modules 516 and the inserted instructions 518 as a single object or as separate objects. The deployment packager 512 may generate a deployment bundle based at least in part on the modules 516 and the inserted instructions 518. In various embodiments, the inserted instructions 518 may be integral to the module 516 obtained by the deployment packager 512. The deployment bundle may include the set of executable instructions corresponding to the module 516 and the inserted instructions 518. The deployment packager 512 may generate the deployment bundle by generating a file system image or other image of the modules 516 and inserted instruction 518 containing the contents and structure required by the computer system in order to execute the modules 516 include in the deployment bundle.

Figure 6:
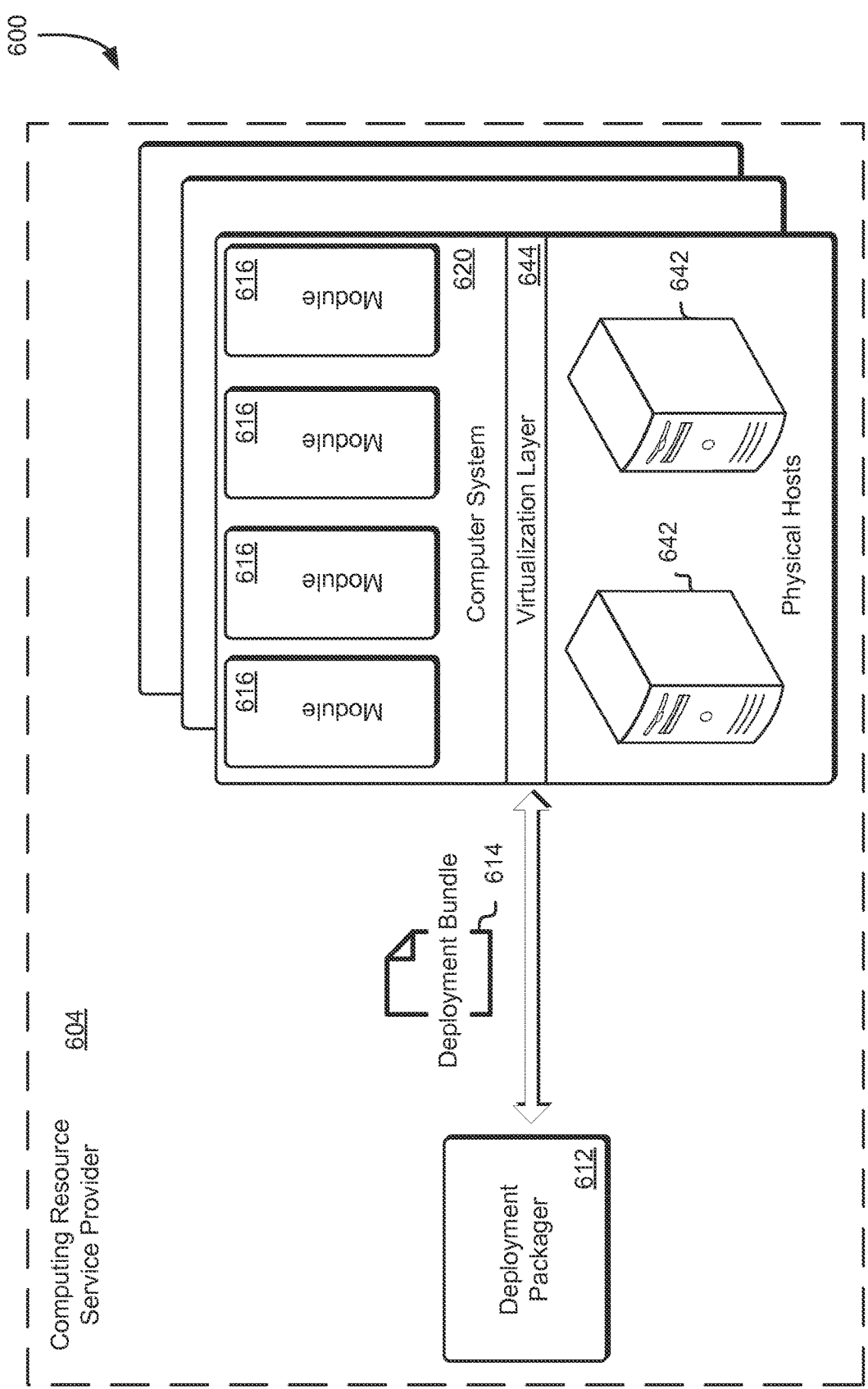
FIG. 6 illustrate an example of an environment in which a deployment bundle may be used to instantiate a program partition in accordance with at least one embodiment.

FIG. 6 illustrates an environment 600 in which a computing resource service provider 604 may execute a computer system 620 based at least in part on a deployment bundle 614, the computer system configured to execute a partition of a program. A deployment packager 612 is used by the computing resource service provider 604 to provide deployment bundles 614 to a virtual computing system service execution system hardware. The deployment packager 612 may be a computer system, as described above, configured to generate deployment bundles 614 including modules of the program such that the modules may be executed by another computer system. The system hardware may include physical hosts 642, virtualization layer 644 and virtual machines 620 as described above. As illustrated in FIG. 6, the partition may include one or more modules 616 to be executed by the computer system 620. The one or more modules 616 may be an alternative to operating system-level virtualization and enable the virtual machine management service to run multiple isolated systems (e.g., partitions) on a computer system 620 or single configuration of system hardware.

The computer system 620 and/or modules 616 may execute the same kernel as the virtualization layer 644, but may also execute additional software and application on top of the kernel-level. For example, the computer system 620 may execute the set of instructions included in the module 616. The modules 616 may be provided memory and file system access through the virtualization layer 644. Access may include access to local memory cache as well as program data as described above. The computer system 620 may include an agent or other process, as described above, configured to provide performance data to a performance analyzer. In some embodiments, the deployment bundle 614 is provided to the virtualization layer 644 and the virtualization layer 644 instantiated computer systems 620 corresponding to one or more partitions based at least in part on the deployment bundle 614. In yet another embodiment, the deployment bundle 614 may be provided to a virtual computer system service and the virtual computer system service may determine one or more physical hosts operation to instantiating the computer systems 620 to execute the partitions indicated in the deployment bundle 614.

Figure 7:
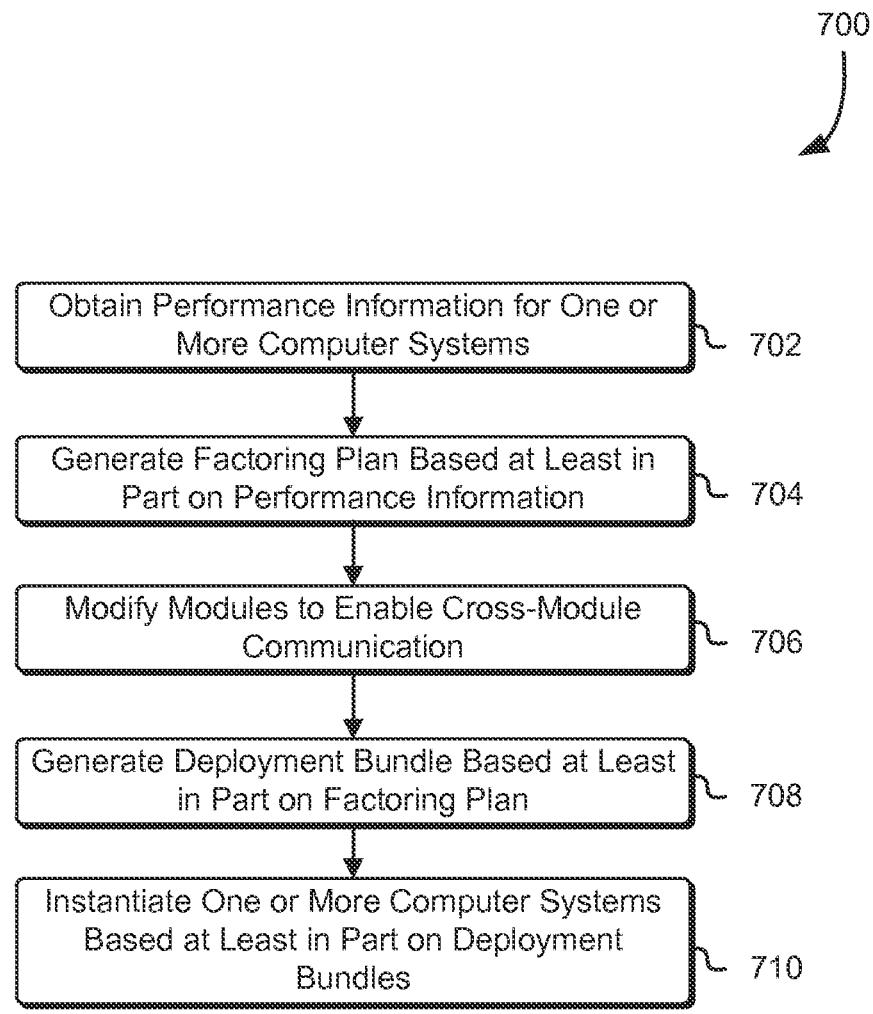
FIG. 7 illustrates an example process for instantiate a program partition using a deployment bundle in accordance with at least embodiment.

FIG. 7 shows an illustrative example of the process 700 which may be used to provide additional computing resources to a program by at least splitting the program into modules and distributing the modules to be executed by one or more computer systems. The process 700 may be performed by any suitable system or combination of systems such as the performance analyzer and deployment packager described above in connection with FIGS. 4 and 5. Returning to FIG. 7, in an embodiment, the process 700 includes obtaining performance information for one or more computer systems. For example, the performance analyzer may obtain information from a set of computer systems executing a set of partitions, each partition containing a subset of modules of a program. In obtained information may include resource utilization of the computer systems, memory and processing capacity of the computer systems, storage capacity, memory fragmentation of the computer systems, amount of data transmitted between the computer systems, and the frequency of data accesses by the computer systems.

The performance analyzer may then generate a factoring plan based at least in part on the obtained performance information 704. In some embodiments, an initial factoring may be generated without the use of performance data. Returning to FIG. 7, the factoring plan may indicate a set of modules to be executed by a single computer system and any cross-module communication to be provided between a module of the set of modules and another module executed by a different computer system. The performance analyzer may generate a single factoring plan, a set of factoring plan, or a factoring plan for all possible combinations of modules and partitions. Furthermore, if more than one factoring plan is generated, a score may be calculated for each factoring plan and a factoring plan that minimizes the score may be selected by the performance analyzer. For example, a weight functions, as described above, may be used to calculate a score for each factoring plan based at least in part on the performance data.

Once a factoring plan is selected for implementation, the modules of the program may be modified to enable cross-module communication 706 as indicated by the factoring plan. As described above a module rewriter may modify the binary executable code corresponding to the modules that require communication with another module executed by a separate computer system. The modify modules may be configured to establish a secure communication channel using any of the methods described above. The modified modules may enable the communication between separate virtual computer system instances executed by the same physical hardware. For example, the same computer server may execute a plurality of virtual computer system instances, at least a portion of which may execute separate partitions of the program as indicated by the factoring plan. The modified modules may be provided to a deployment packager, the deployment packager may then generate a deployment bundle based at least in part on the factoring plan. The deployment bundles may be configured to enable a virtual computer system service to instantiate one or more computer system in order to execute the set of partitions and corresponding modules indicated in the factoring plan, as described above in connection with FIG. 6. As a result, the service provider or component thereof to instantiate one or more computer systems based at least in part on the deployment bundle 710.

The computer systems may be responsible for executing the modules of the program and providing performance information to the performance analyzer. The computer systems may be virtual computer systems operated by the computing resource service provider as described above.

Figure 8:
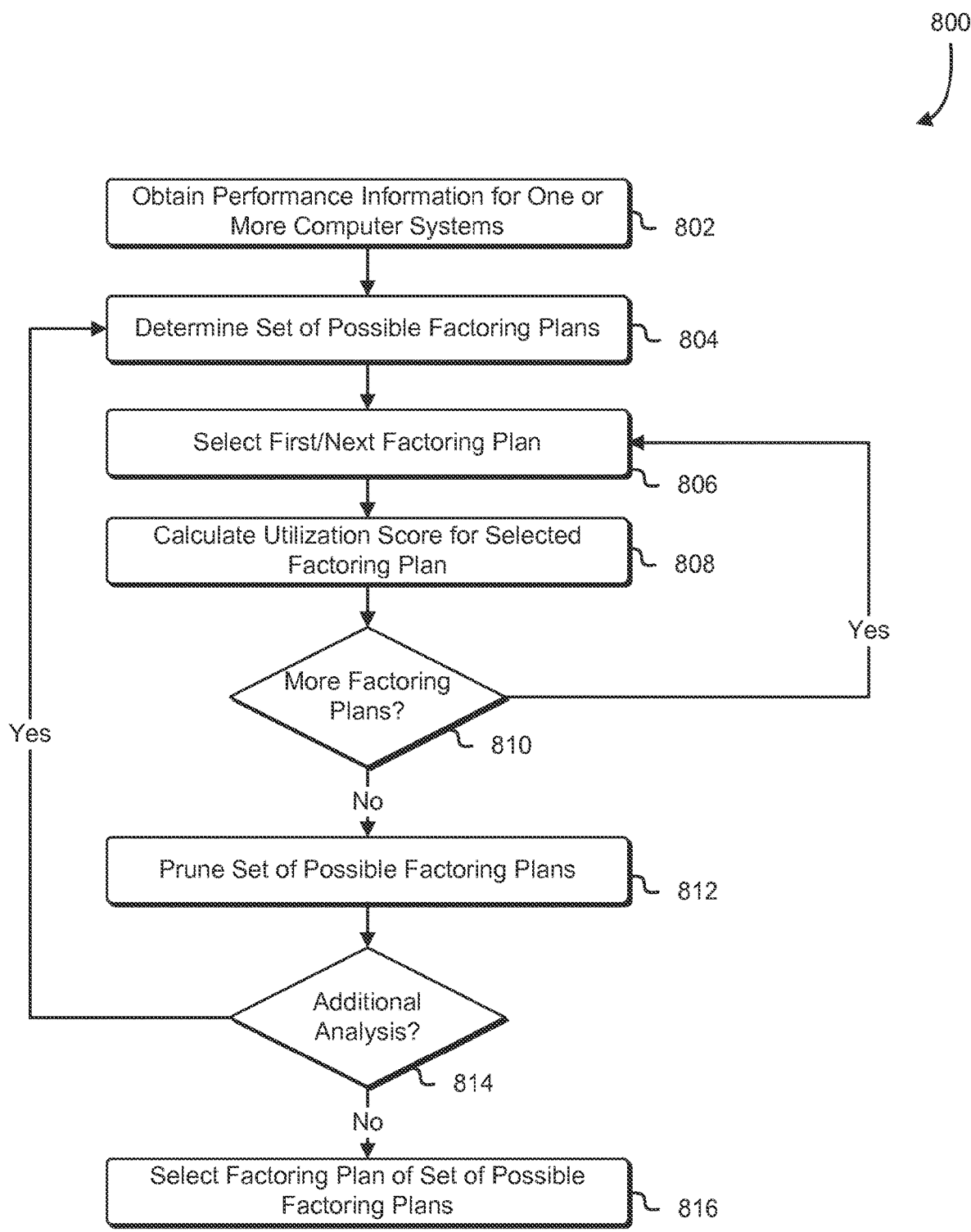
FIG. 8 illustrates an example process for selecting a factoring plan in accordance with at least embodiment.

FIG. 8 shows an illustrative example of the process 800 which may be used to determine a factoring plan for a program, the factoring plan configured to at least split the program into modules and distribute the modules to one or more computer systems for execution. The process 800 may be performed by any suitable system such as the performance analyzer described above in connection with FIG. 4 or any combination of systems. Returning to FIG. 8, in an embodiment, the process 800 includes obtaining performance information from one or more computer systems 802. Ad described above, the computer system or component of the computer system executing the partitions, such as the virtualization layer, may include a process or application configured to provide the performance analyzer with performance and or utilization information corresponding to the computer systems and/or partitions executed by the computer system. The obtain performance data may be stored by the performance analyzer and a history of the computer systems, partitions, and/or factoring plan's performance may be maintained and used in determining and selecting factoring plans.

The performance analyzer may then determine a set of faction plans 804. The performance analyzer may calculate the utilization rate for one or more partitions based on the obtained performance data and determine a set of factoring plans based at least in part on the calculate utilization rate. For example, a first module executing within the same partition as a second module may utilize 100 percent of the computer systems resources during operation of a first factoring plan. During operation of a second factoring plan the first module executing with the same partition as a third module may only utilize 80 percent of the computer system's resources. The performance analyzer may determine based at least in part on this information that the first partition and the third partitions have a utilization rate of 40 percent and the second partition has a utilization rate of 60 percent. In numerous variations of process 800, determining the set of factoring plans includes determine the set of all possible combinations of modules.

The performance analyzer may then select the first/next factoring plan 806 in order to calculate a utilization score for the selected factoring plan 808. As described above, one or more functions may be used to calculate the utilization score for the selected factoring plan including various weighted functions and/or penalty functions. The utilization score may indicate the amount of wasted resources and/or inefficiencies in the factoring plan. Furthermore, the utilization score may indicate the feasibility and/or infeasibility of the factoring plans. For example, if the factoring plan includes two modules in a single partition with a utilization rate of above 100 percent the utilization score may indicate that the particular factoring plan is infeasible.

If there are additional factoring plans 810, the performance analyzer may select the next factoring plan 806 otherwise process 800 may continue. The performance analyzer may then prune the set of factoring plan 812. For example, as described above in the utilization score for the particular factoring plan is not with in certain constraints, such as the resource available to the program, the performance analyzer may remove the particular factoring plan from the set of possible factoring plans. The performance analyzer may then determine whether to perform additional analysis 814. For example, if the calculated utilization scores for the factoring plans are below a specified level, the performance analyzer may determine that additional factoring plans are required. If additional analysis is required, the performance analyzer may determine another set of possible factoring plans. If no additional analysis is required, the performance analyzer may then select a factoring plan from the set of possible factoring plans 816. The selection may be based on one or more criteria, such as minimizing the utilization score or maximizing the amount of resource made available to the program. The selection may also be on a random or pseudorandom basis. For example, the performance analyzer may be configured to perform tests on feasible factoring plans in order to determine an optimal factoring plan as described above.

Figure 9:
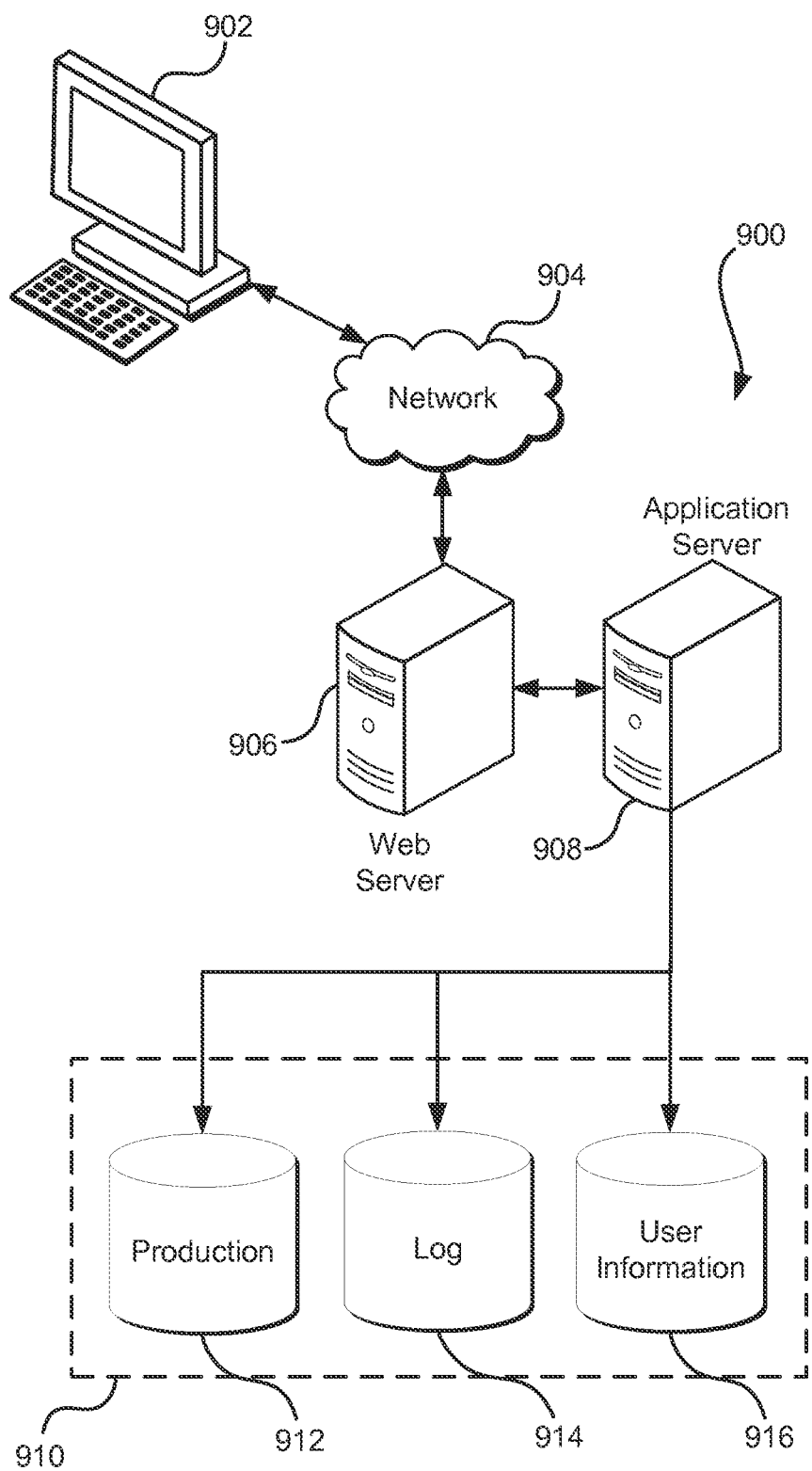
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a program module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 902 and the application server 908, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining an application, the application comprising a set of program modules and annotations corresponding to the set of program modules, at least some of the annotations indicating that splitting particular program modules of the set of program modules into different partitions causes degradation of performance of the particular program modules, the set of program modules comprising executable instructions;
   executing the application;
   obtaining performance information from one or more computer systems executing the application, the performance information indicating resource utilization of the one or more computer systems;
   generating a factoring plan based at least in part on the performance information and the annotations, the factoring plan indicating a partitioning of the application, the partitioning comprising a plurality of partitions, each partition of the plurality of partitions including a subset of the set of program modules and to be executed by a different computer system;
   modifying at least a portion of the executable instructions based at least in part on the factoring plan, thereby generating modified executable instructions that, if executed, cause state information to be shared between partitions of the particular program modules of the set of program modules and that designate a particular data region as a shared data region between two or more partitions; and
   constructing a deployment bundle indicating a number of partitions and subsets of program modules to be executed by each partition, wherein constructing the deployment bundle further includes constructing the deployment bundle to include an encryption key operable to send and receive messages over at least one encrypted communications channel between two or more modules of the set of modules during cross-module function calls.

2. The computer-implemented method of claim 1, wherein the computer-implemented method further includes determining a utilization rate for a program module of the set of program modules based at least in part on the performance information of a computer system responsible for executing the module.

3. The computer-implemented method of claim 1, wherein the computer-implemented method further includes calculating a utilization score for the factoring plan based at least in part on a utilization rate for each program module of the set of program modules and an amount of computing resources available for computer systems executing the set of program modules.

4. The computer-implemented method of claim 1, wherein at least some of the annotations indicate modules that do not share in-memory state, and at least some of the annotations indicate modules that share at least some in-memory state.

5. A system, comprising:
   one or more processors; and
   memory with instructions that, if executed by the one or more processors, cause the system to:
      obtain a program including a set of modules and annotations corresponding to the set of modules, the set of modules comprising executable code;
      generate a factoring plan for the program based at least in part on the annotations and performance information generated during execution of the program; and
      generate a deployment bundle of a first partition as defined by the factoring plan by at least:
         obtaining a subset of modules of the set of modules, where the subset of modules is indicated in the factoring plan as included in the first partition;
         determining, based at least in part on the annotations, that splitting one or more modules of the subset of modules from the first partition causes additional function calls to be generated to maintain proper operation of the program;

generating, based at least in part on the subset of modules, additional executable code that, if executed, further causes state information to be shared between the first partition and a second partition and that designate a particular data region as a shared data region between the first partition and the second partition, where the first partition and the second partition are executed by different computer systems; and constructing the deployment bundle to include an encryption key operable to send and receive messages over at least one encrypted communications channel between two or more modules of the set of modules in a cross-module function call.

6. The system of claim 5, wherein the memory further includes instructions that, if executed by the one or more processors, cause the system to obtain performance information corresponding to a utilization metric of the set modules.

7. The system of claim 6, wherein the memory further includes instructions that, if executed by the one or more processors, cause the system to:

obtain additional performance information corresponding to the factoring plan; and generate a second factoring plan based at least in part on the obtained additional performance information.

8. The system of claim 5, wherein the memory further includes instructions that, if executed by the one or more processors, cause the system to analyze the set of modules included in the program to determine cross-module function calls that require state information to be shared between at least two modules.

9. The system of claim 5, wherein the memory further includes instructions that, if executed by the one or more processors, cause the system to determine a utilization score for the factoring plan based at least in part on an amount of computing resource available to the first partition and an amount of computing resources utilized by the subset of modules included in the first partition.

10. The system of claim 5, wherein generating the factoring plan includes determining one or more partitions, each partition of the one or more partitions to execute at least one module of the set of modules.

11. The system of claim 5, wherein the memory further includes instructions that, if executed by the one or more processors, cause the system to determine a utilization score for the factoring plan based at least in part on an estimated cost of cross-module function calls between the subset of modules included in the first partition and at least one module of another partition.

12. The system of claim 5, wherein modifying the subset of modules further includes inserting executable instruction into the subset of module such that, when the inserted executable instructions are executed by one or more processors of first computer system executing the first partition, cause the first computer system to establish a communications channel with a second computer system executing the second partition.

13. The system of claim 5, wherein the memory further includes instructions that, if executed by the one or more processors, cause the system to provide the deployment bundle to another system causing the other system to instantiate a set of computing resources of the other computer system configured to execute the subset of modules included in the first partition and an agent configured to provide performance information to the system.

14. A non-transitory computer-readable storage medium that includes executable instructions stored thereon that, if executed by one or more processors of a computer system, cause the computer system to at least:

obtain utilization information for a partition, where the utilization information for the partition is based at least in part on resource utilization of a computer system instance executing a set of modules included in the partition, the set of modules being a subset of a plurality of modules of a program running on a plurality of partitions, at least some modules of the plurality of modules being directly executable by the computer system instance;

determine a factoring plan based at least in part on the obtained utilization information and annotation information in the program, at least some of the annotation information identifying one or more partition splitpoints that cause degradation of performance of the set of modules that share state information;

generate, based at least in part on the annotation information, new executable code that, if executed by the one or more processors, causes at least a portion of the set of modules to communicate between remote partitions of the plurality of partitions indicated in the factoring plan by at least providing the portion of the set of modules with additional resources, and causes a particular data region to be designated as a shared data region between two or more partitions; and generate a deployment bundle to include an encryption key operable to send and receive messages over at least one encrypted communications channel between two or more modules of the plurality of modules in a cross-module function.

15. The non-transitory computer-readable storage medium of claim 14, wherein the instructions further comprise instructions that, if executed by the one or more processors, cause the computer system to evaluate a plurality of factoring plans corresponding to other partitions of the plurality of partitions.

16. The non-transitory computer-readable storage medium of claim 14, wherein the additional resources include cryptographic material configured to enable the portion of the set of modules to encrypt communications between the portion of the modules of the set of modules.

17. The non-transitory computer-readable storage medium of claim 14, wherein the instructions that cause the computer system to enable the portion of the set of modules to communicate between remote partitions further include instructions that cause the computer system to modify a set of executable instructions corresponding to the portion of the set of modules, the modified set of executable instructions configured to enable cross-module function calls.

18. The non-transitory computer-readable storage medium of claim 14, wherein the instructions further comprise instructions that, if executed by the one or more processors, cause the computer system to cause one or more new computer system instances to be instantiated based at least in part on the factoring plan, where the one or more new computer system instances correspond to partitions indicated in the factoring plan.

19. The non-transitory computer-readable storage medium of claim 14, wherein the instructions further comprise instructions that, if executed by the one or more processors, cause the computer system to generate a plurality of factoring plans based at least in part on the set of modules.

20. The non-transitory computer-readable storage medium of claim 19, wherein the instructions further comprise instructions that, if executed by the one or more processors, cause the computer system to calculate a score for the plurality of factoring plans based at least in part on the obtained information.

\* \* \* \* \*